US012130970B2

(12) United States Patent
Wu et al.

(10) Patent No.: US 12,130,970 B2
(45) Date of Patent: Oct. 29, 2024

(54) WIRELESS KEYBOARD (71) Applicant: HONOR DEVICE CO., LTD., Shenzhen (CN)

(72) Inventors: Yuan Wu, Shenzhen (CN); Wei Zhang, Shenzhen (CN); Feng Wang, Shenzhen (CN); Chao Wang, Shenzhen (CN); Lilie Zhao, Shenzhen (CN); Wei Tong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/924,223

(22) PCT Filed: Jan. 14, 2022

(86) PCT No.: PCT/CN2022/072173
§ 371 (c)(1),
(2) Date: Nov. 9, 2022

(87) PCT Pub. No.: WO2022/199231
PCT Pub. Date: Sep. 29, 2022

(65) Prior Publication Data
US 2023/0229244 A1 Jul. 20, 2023

(30) Foreign Application Priority Data
Mar. 24, 2021 (CN) .......................... 202110312784.1

(51) Int. Cl.
*G06F 3/023* (2006.01)
*G06F 1/16* (2006.01)
(Continued)

(52) U.S. Cl.
CPC .......... *G06F 3/0231* (2013.01); *G06F 1/1669* (2013.01); *G06F 3/0202* (2013.01); *G06F 3/03545* (2013.01); *H02J 50/12* (2016.02)

(58) Field of Classification Search
None
See application file for complete search history.

(56) References Cited

U.S. PATENT DOCUMENTS

| 5,710,988 | A | 1/1998 | Suzuki et al. | |
| 9,685,814 | B1 * | 6/2017 | Moyer | H02J 7/00034 |

(Continued)

FOREIGN PATENT DOCUMENTS

| CN | 101840278 A | 9/2010 |
| CN | 203225555 U | 10/2013 |

(Continued)

*Primary Examiner* — Matthew Yeung
(74) *Attorney, Agent, or Firm* — WOMBLE BOND DICKINSON (US) LLP (57) ABSTRACT This application discloses a wireless keyboard. The wireless keyboard includes a connection portion. The connection portion includes an accommodating cavity with an opening at an end and used for accommodating an electronic stylus. A wireless charging coil is arranged in the accommodating cavity. A charging interface and a wireless charging control module are arranged in the wireless keyboard. The wireless charging control module is connected to the charging interface and the wireless charging coil. The charging interface can receive a direct current signal. The wireless charging control module can convert, if it is detected that a direct current signal is inputted to the charging interface, the direct current signal into an alternating current signal and transmit the alternating current signal to the wireless charging coil. The wireless charging coil generates an alternating electromagnetic field in response to the alternating current signal, to wirelessly charge the electronic stylus.

20 Claims, 8 Drawing Sheets (51) Int. Cl.
*G06F 3/02* (2006.01)
*G06F 3/0354* (2013.01)
*H02J 50/12* (2016.01)

(56) References Cited

U.S. PATENT DOCUMENTS

| | | | |
|---|---|---|---|
| 10,627,923 | B2 | 4/2020 | Ruscher et al. |
| 10,892,625 | B1 | 1/2021 | Franklin et al. |
| 11,061,490 | B2 * | 7/2021 | Jiang .................. G06F 3/03545 |
| 11,209,861 | B2 | 12/2021 | Ku et al. |
| 11,392,225 | B2 | 7/2022 | Park et al. |
| 2010/0039064 | A1 | 2/2010 | Locker et al. |
| 2010/0090656 | A1 | 4/2010 | Shearer et al. |
| 2012/0140428 | A1 * | 6/2012 | Hsu ...................... G06F 1/1613 |
| | | | 361/807 |
| 2013/0016468 | A1 | 1/2013 | Oh |
| 2013/0321358 | A1 | 12/2013 | Park et al. |
| 2014/0253469 | A1 | 9/2014 | Hicks et al. |
| 2014/0255899 | A1 | 9/2014 | Poullain |
| 2015/0041341 | A1 | 2/2015 | Marshall et al. |
| 2016/0329751 | A1 * | 11/2016 | Mach ...................... H02J 50/90 |
| 2017/0222456 | A1 | 8/2017 | Perez et al. |
| 2020/0285279 | A1 * | 9/2020 | Zimmerman .......... F16M 11/10 |
| 2021/0325981 | A1 * | 10/2021 | Park ........................ H02J 50/70 |

FOREIGN PATENT DOCUMENTS

| | | |
|---|---|---|
| CN | 107045395 A | 8/2017 |
| CN | 107831911 A | 3/2018 |
| CN | 207067941 U | 3/2018 |
| CN | 108390443 A | 8/2018 |
| CN | 108885476 A | 11/2018 |
| CN | 208226625 U | 12/2018 |
| CN | 209573603 U | 11/2019 |
| CN | 209895309 U | 1/2020 |
| CN | 112698733 A | 4/2021 |
| IN | 102880298 A | 1/2013 |
| KR | 20200012387 A | 2/2020 |

\* cited by examiner

WIRELESS KEYBOARD

CROSS-REFERENCE TO RELATED APPLICATIONS

This application is a national stage of International Application No. PCT/CN2022/072173, filed on Jan. 14, 2022, which claims priority to Chinese Patent Application No. 202110312784.1, filed on Mar. 24, 2021, both of which are incorporated herein by reference in their entireties.

TECHNICAL FIELD

Embodiments of this application relate to the field of terminal technologies, and in particular, to a wireless keyboard.

BACKGROUND

Battery is an indispensable component in various electronic products, and is a tool that may provide electricity storage for electronic products. A battery of an electronic product may store electricity through charging, and then power the electronic product through discharging.

The electronic product may charge the battery not only through wired charging, but also through wireless charging. Wireless charging has become an indispensable function for small electronic products (for example, electronic styluses) particularly.

Currently, most electronic styluses may be wirelessly charged in the following manner. Specifically, a wireless charging coil is arranged on an electronic stylus. The electronic stylus may be attached to a fixed position on another electronic product (for example, a tablet computer). A wireless charging coil is arranged at the fixed position of the tablet computer. When the electronic stylus is attached to the fixed position of the tablet computer, the wireless charging coil of the tablet computer may be coupled with the wireless charging coil of the electronic stylus, to wirelessly charge the electronic stylus.

In the foregoing solution, the electronic stylus can be wireless charged only when being normally attached to the tablet computer. Generally, a user attaches the electronic stylus to the tablet computer to charge the electronic stylus when the electronic stylus is not in use. As mobile terminals, the electronic stylus and the tablet computer require some portability. However, after the electronic stylus is attached to the tablet computer, neither the electronic stylus nor the tablet computer is easy to carry, causing poor portability.

Therefore, there is an urgent need for an electronic product that takes into account both wireless charging and an accommodating function of an electronic stylus.

SUMMARY

This application provides a wireless keyboard. The wireless keyboard not only has a function of accommodating an electronic stylus, but also can wirelessly charge the electronic stylus.

According to a first aspect, this application provides a wireless keyboard. The wireless keyboard includes: a keyboard body, a holder for placing a tablet computer, and a connection portion for movably connecting the keyboard body and the holder.

The connection portion includes an accommodating cavity with an opening at an end, the accommodating cavity is used for accommodating an electronic stylus through the opening, and a wireless charging coil is arranged in the accommodating cavity. A charging interface and a wireless charging control module are arranged in the keyboard body, the wireless charging control module is connected to the charging interface, and the wireless charging control module is connected to the wireless charging coil.

The charging interface is configured to receive a direct current signal. The wireless charging control module is configured to convert, if it is detected that a direct current signal is inputted to the charging interface, the direct current signal into an alternating current signal and transmit the alternating current signal to the wireless charging coil. The wireless charging coil is configured to generate an alternating electromagnetic field in response to the alternating current signal, to wirelessly charge the electronic stylus accommodated in the accommodating cavity.

The wireless keyboard provided in this application can wirelessly charge the electronic stylus accommodated in the accommodating cavity of the wireless keyboard. That is, the wireless keyboard not only has a function of accommodating the electronic stylus, but also can wirelessly charge the electronic stylus.

In a possible design manner of the first aspect, the wireless keyboard is a Bluetooth keyboard.

In a possible design manner of the first aspect, the connection portion includes a rotating shaft, and the rotating shaft is configured to movably connect the keyboard body and the holder. The rotating shaft is hollow inside, and an opening is provided at an end of the rotating shaft, to form the accommodating cavity. This design manner provides a specific implementation of the connection portion.

In another possible design manner of the first aspect, the connection portion includes a flexible connector and an accommodating component. The flexible connector is configured to bend to movably connect the keyboard body and the holder. The accommodating component is fixed in a bent region of the flexible connector, the accommodating component is hollow inside, and an opening is provided at an end of the accommodating component, to form the accommodating cavity. For example, the flexible connector may be made of a flexible foldable material. This design manner provides a specific implementation of the connection portion.

In another possible design manner of the first aspect, a voltage stabilizing module is further arranged in the keyboard body. That the wireless charging control module is connected to the charging interface may further include that: the wireless charging control module is connected to the charging interface through the voltage stabilizing module. The voltage stabilizing module is configured to convert a voltage of a direct current signal from the charging interface into a working voltage of the wireless charging control module. In this application, the voltage of the direct current signal provided by the charging interface may be converted into the working voltage of the wireless charging control module by using the voltage stabilizing module. In this way, the normal operation of the wireless charging control module can be guaranteed.

In another possible design manner of the first aspect, an elastic pressing component is further arranged in the accommodating cavity, where when the electronic stylus is accommodated in the accommodating cavity, the elastic pressing component is in contact with a first end of the electronic stylus. The elastic pressing component is configured to eject, in response to a press operation of a user on a second end of the electronic stylus accommodated in the accommodating cavity, the electronic stylus out of the accommodating cavity from the second end toward the first end. The first end is an end located at the opening when the electronic stylus is accommodated in the accommodating cavity, and the second end is opposite to the first end. The elastic pressing component helps the user to take out the electronic stylus from the accommodating cavity of the wireless keyboard.

In another possible design manner of the first aspect, the charging interface may include any one of a Type-C interface, a Micro B interface, or a POGO pin interface.

In another possible design manner of the first aspect, the keyboard body further includes a charging control module and a battery. The charging control module is connected to the battery, and the charging control module is connected to the charging interface. The charging control module is configured to receive the direct current signal inputted from the charging interface, and use the direct current signal to charge the battery. The wireless keyboard can support not only reverse wireless charging, but also wired charging.

In another possible design manner of the first aspect, the wireless charging control module is integrated in a wireless charging control chip (for example, a Tx chip).

According to a second aspect, this application provides a wireless charging system. The wireless charging system includes an electronic stylus, and the wireless keyboard according to the first aspect and any possible design manner 25 thereof. The electronic stylus includes a wireless charging coil, a wireless charging control module, a charging control module, and a battery.

The wireless charging coil is configured to generate, after the electronic stylus is accommodated in the wireless keyboard, an alternating current signal by inducing an alternating electromagnetic field provided by the wireless keyboard, and transmit the alternating current signal to the wireless charging control module. The wireless charging control module is configured to convert the alternating current signal into a direct current signal, and transmit the direct current signal to the charging control module. The charging control module is configured to use the direct current signal to charge the battery.

According to a third aspect, this application provides a computer-readable storage medium, including computer instructions. The computer instructions, when run on a wireless keyboard, cause the wireless keyboard to perform the functions of the wireless keyboard according to the first aspect and any possible design manner thereof.

According to a fourth aspect, this application provides a computer program product. The computer program product, when run on a computer, causes the computer to perform the functions of the wireless keyboard according to the first aspect and any possible design manner thereof.

It may be understood that, for beneficial effects that can be achieved by the wireless charging system according to the second aspect, the computer-readable storage medium according to the third aspect, and the computer program product according to the fourth aspect provided above, reference may be made to beneficial effects in the first aspect and any possible design manner thereof. Details are not repeated herein.

DESCRIPTION OF EMBODIMENTS

The terms "first" and "second" mentioned below are merely intended for a purpose of description, and shall not be understood as an indication or implication of relative importance or implicit indication of the quantity of indicated technical features. Therefore, features defining "first" and "second" may explicitly or implicitly include one or more such features. In the descriptions of the embodiments, unless otherwise stated, "a plurality of" means two or more.

The embodiments of this application provide a wireless keyboard. The wireless keyboard not only has a function of accommodating an electronic stylus, but also can wirelessly charge the electronic stylus.

Figure 1:
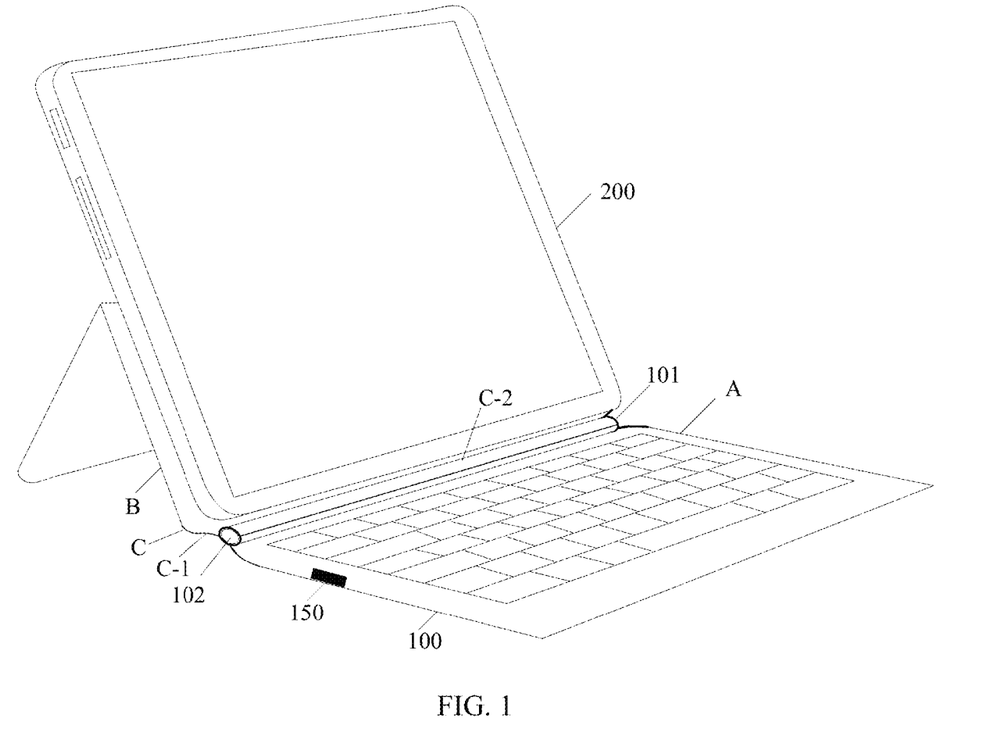
FIG. 1 is a schematic diagram of a product form of a wireless keyboard according to an embodiment of this application.

In one aspect, the wireless keyboard may provide an accommodating cavity for accommodating a stylus. For example, FIG. 1 is a schematic diagram of a product form of a wireless keyboard 100 according to an embodiment of this application. As shown in FIG. 1, the wireless keyboard 100 includes: a keyboard body A and a holder B for placing a tablet computer 200. The keyboard body A and the holder B are movably connected through a connection portion C. As shown in FIG. 1, an accommodating cavity 101 is provided on the connection portion C, and an opening 102 is provided at an end of the accommodating cavity 101. The accommodating cavity 101 may accommodate an electronic stylus 300 shown in FIG. 2 through the opening 102.

Figure 3:
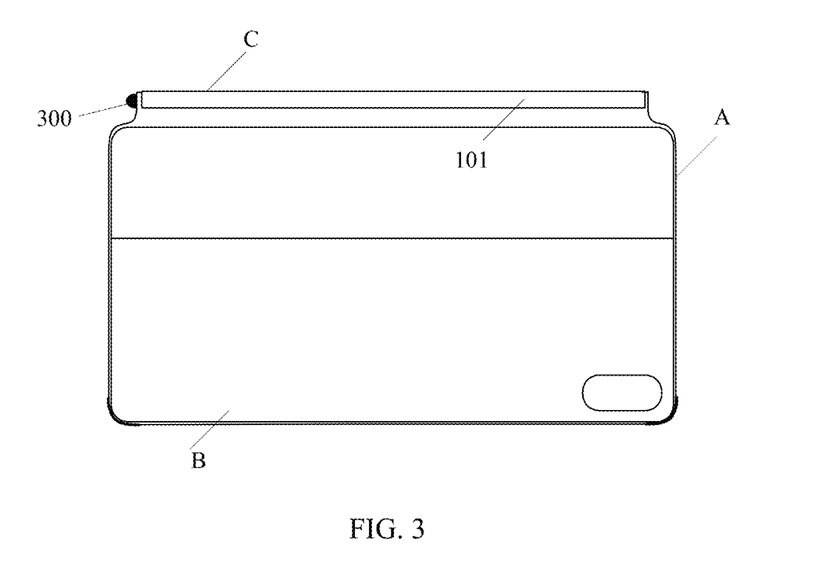
FIG. 3 is a bottom view of the wireless keyboard shown in FIG. 1 after the electronic stylus shown in FIG. 2 is accommodated.
Figure 4:
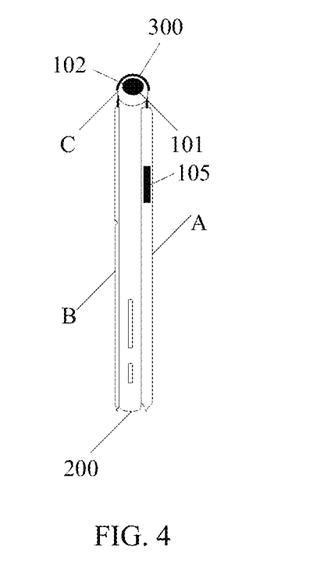
FIG. 4 is a left view of the wireless keyboard shown in FIG. 1 after the electronic stylus shown in FIG. 2 is accommodated.

Referring to FIG. 3 and FIG. 4, FIG. 3 is a bottom view of the wireless keyboard 100 after the keyboard body A and the holder B of the wireless keyboard 100 are combined, and the electronic stylus 300 is inserted into the accommodating cavity 101 through the opening 102. FIG. 4 is a left view of the wireless keyboard 100 after the keyboard body A and the holder B of the wireless keyboard 100 are combined, and the electronic stylus 300 is inserted into the accommodating cavity 101 through the opening 102.

In another aspect, a wireless charging coil is arranged in the foregoing accommodating cavity (for example, the accommodating cavity 101). After the electronic stylus 300 is accommodated in the accommodating cavity 101 of the wireless keyboard 100, the wireless keyboard 100 can wirelessly charge the electronic stylus 300 through the foregoing wireless charging coil. Certainly, a wireless charging coil is also arranged on the body of the electronic stylus 300. In this way, the wireless charging coil of the wireless keyboard 100 may be coupled with the wireless charging coil of the electronic stylus 300, and the wireless keyboard 100 may transmit a wireless charging signal to the electronic stylus 300 through the wireless charging coil to wirelessly charge the electronic stylus 300.

In the embodiments of this application, the function of the wireless keyboard 100 for wirelessly charging the electronic stylus 300 through the wireless charging coil is referred to as a "reverse wireless charging function".

Certainly, the wireless keyboard 100 may alternatively receive a wireless charging input of another device through the wireless charging coil. For example, the another device may be a wireless charging base of the wireless keyboard 100; or the another device may be another terminal that supports wireless charging. The function of the wireless keyboard 100 for receiving a wireless charging input of another device through the wireless charging coil is referred to as a "forward wireless charging function".

The wireless keyboard 100 may also support wired charging. The wired charging described in the embodiments of this application refers to that a charging interface of the wireless keyboard 100 may be connected to a wired charger (also referred to as a power adapter) to receive a charging input from the wired charger. For example, the charging interface may be a universal serial bus (universal serial bus, USB) interface.

It should be noted that, the method of the embodiments of this application may be applied to the process of wirelessly charging the electronic stylus 300 by the wireless keyboard 100. That is, the method may be applied to the process of reverse wireless charging of the wireless keyboard 100.

For ease of understanding, the principle of wirelessly charging the electronic stylus 300 by the wireless keyboard 100 is described in the embodiments of this application with reference to the accompanying drawings.

Figure 5:
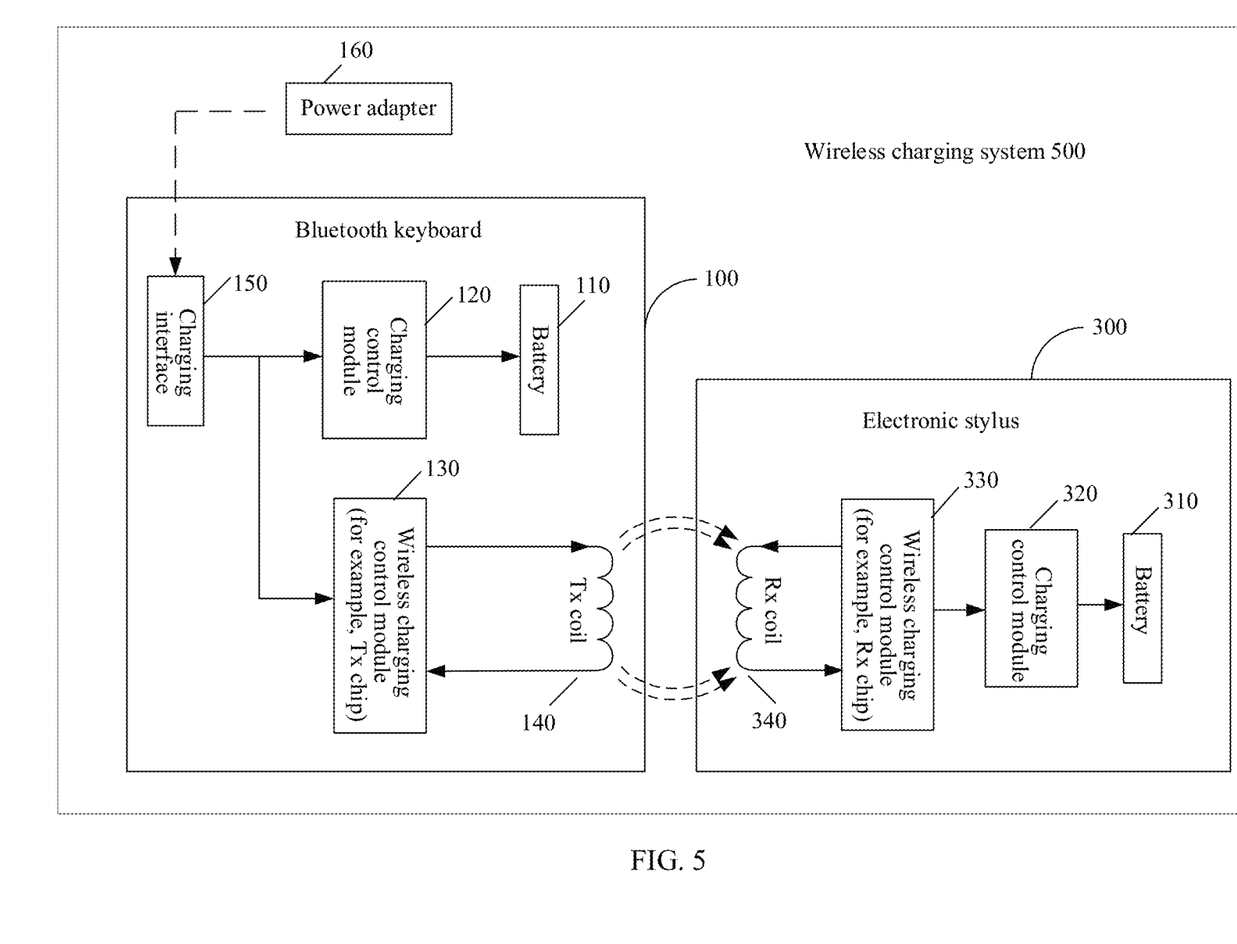
FIG. 5 is a schematic diagram of a system architecture of a wireless charging system according to an embodiment of this application.

FIG. 5 is a schematic diagram of a system architecture of a wireless charging system 500 according to an embodiment of this application. The wireless charging system 500 includes a wireless keyboard 100 and an electronic stylus 300.

As shown in FIG. 5, the wireless keyboard 100 includes: a battery 110, a charging control module 120, a wireless charging control module 130, a wireless charging coil 140, and a charging interface 150. The electronic stylus 300 includes: a battery 310, a charging control module 320, a wireless charging control module 330, and a wireless charging coil 340.

In the embodiments of this application, the wireless keyboard 100 serves as a transmitting end of wireless charging signals, the electronic stylus 300 serves as a receiving end of wireless charging signals, and the wireless keyboard 100 wirelessly charges the electronic stylus 300. Therefore, as shown in FIG. 5, the wireless charging coil 140 of the wireless keyboard 100 may be referred to as a transmitting (Tx) coil, and the wireless charging coil 340 of the electronic stylus 300 may be referred to as a receiving (Rx) coil.

The charging control module 120 may be a keyboard charger of the wireless keyboard 100, and the wireless charging control module 130 may be a Tx chip. The charging control module 320 may be a charger of the electronic stylus 30, and the wireless charging control module 130 may be an Rx chip.

Generally, a reverse wireless charging function of the wireless keyboard 100 is disabled by default. The wireless keyboard 100 may enable the reverse wireless charging function after detecting that a direct current signal is inputted to the charging interface 150.

After the reverse wireless charging function of the wireless keyboard 100 is enabled, the wireless charging control module 130 of the wireless keyboard 100 may receive the direct current signal inputted from the charging interface 150. The wireless charging control module 130 may convert the direct current signal into an alternating current signal, and then input the alternating current signal to the wireless charging coil 140. The wireless charging coil 140 may generate an alternating electromagnetic field in response to the alternating current signal.

The wireless charging coil 140 of the electronic stylus 300 is coupled with the wireless charging coil 340 of the wireless keyboard 100. After the electronic stylus 300 is accommodated in the accommodating cavity 101 of the wireless keyboard 100, the wireless charging coil (that is, the Rx coil) 340 starts to work. The wireless charging coil (that is, the Rx coil) 340 may induce the alternating electromagnetic field emitted by the wireless charging coil (that is, the Tx coil) 140 to generate an alternating current signal, and input the alternating current signal to the wireless charging control module 330. The wireless charging control module 330 may rectify the alternating current signal into a direct current signal, and input the direct current signal to the charging control module 320. The charging control module 320 may charge the battery 310 according to the direct current signal.

The wireless charging control module 130 and the wireless charging control module 330 may each include a matching circuit. The matching circuit may include a capacitor combination. The matching circuit in the wireless charging control module 130 is configured to form LC resonance with the wireless charging coil 140, to improve the transmission efficiency of the wireless charging coil 140. The matching circuit in the wireless charging control module 330 is configured to form LC resonance with the wireless charging coil 340, to improve the receiving efficiency of the wireless charging coil 340.

Certainly, the wireless keyboard 100 may alternatively receive a wireless charging input of another device through the wireless charging coil 140, that is, the wireless keyboard 100 supports forward wireless charging. For the forward wireless charging principle of the wireless keyboard 100, refer to the wireless charging principle of the electronic stylus 300 in the process of wireless charging the electronic stylus 300 by the wireless keyboard 100.

The wireless keyboard 100 may also support wired charging. For example, when a power adapter 160 (that is, a wired charger) connected to a power supply is connected to the charging interface 150, the charging interface 150 has a charging input. The charging control module 120 is connected to the charging interface 150, and is configured to receive the charging input from the power adapter 160 through the charging interface 150, to charge the battery 110. For example, the charging interface 150 may be a USB interface.

In some embodiments, the electronic stylus 300 may also support wired charging. For example, the electronic stylus 300 may also include a charging interface (not shown in the figure). The charging interface is configured to be connected to the power adapter to charge the electronic stylus 300 by wire.

It should be noted that, FIG. 5 is only a schematic structural diagram of a possible charging circuit of the wireless keyboard 100 and the electronic stylus 300. In the embodiments of this application, charging circuit structures of the wireless keyboard and the electronic stylus include, but are not limited to, the structure shown in FIG. 5. For example, the functions of the charging control module 120 and the wireless charging control module 130 shown in FIG. 5 may be integrated into a charging management module to be implemented. In another example, the wireless keyboard 100 may further include a processor, and the processor is connected to the charging control module 120, the wireless charging control module 130, and the charging interface 150. The processor is configured to detect whether the charging interface 150 has a charging input. The processor is further configured to control the operation of the charging control module 120 and/or the wireless charging control module 130, to implement the wired charging function and/or the reverse wireless charging function of the wireless keyboard 100.

Figure 6:
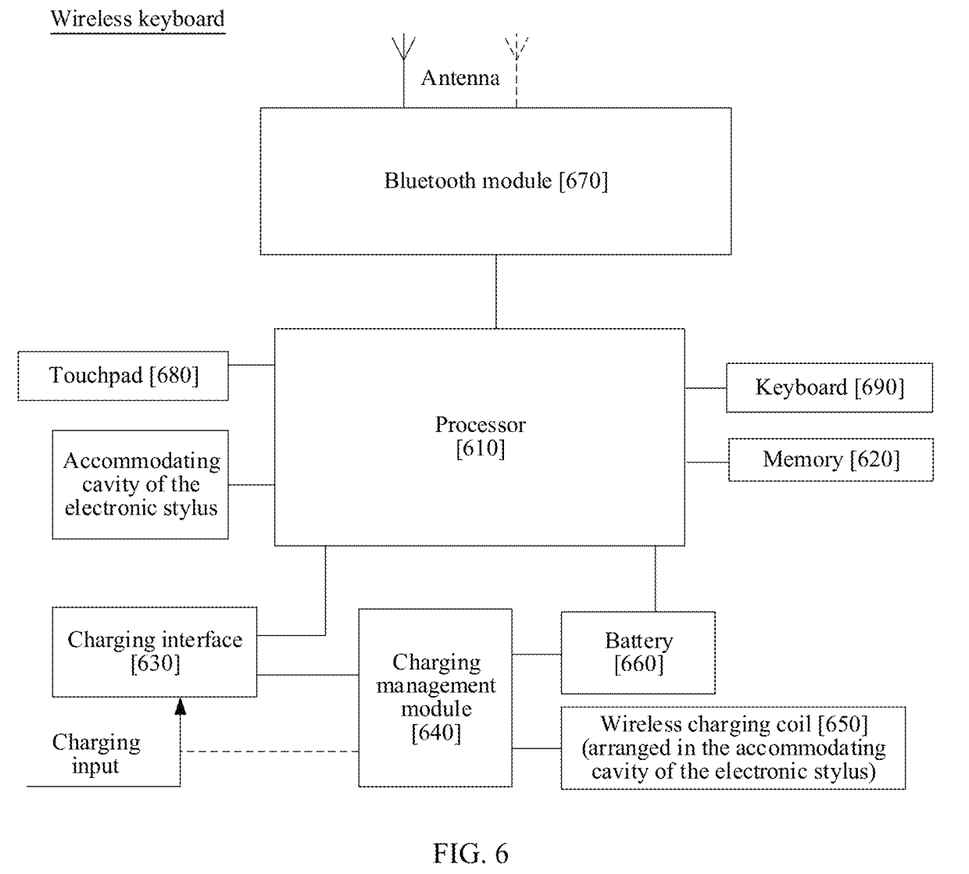
FIG. 6 is a schematic diagram of a hardware structure of a wireless keyboard according to an embodiment of this application.

FIG. 6 is a schematic structural diagram of a wireless keyboard according to an embodiment of this application. As shown in FIG. 6, the wireless keyboard may include a processor 610, a memory 620, a charging interface 630, a charging management module 640, a wireless charging coil 650, a battery 660, a wireless communication module 670, a touchpad 680, a keyboard 690, and the like.

The processor 610, the memory 620, the charging interface 630, the charging management module 640, the battery 660, the wireless communication module 670, the touchpad 680, the keyboard 690, and the like may all be arranged on a keyboard body (for example, the keyboard body A shown in FIG. 1) of the wireless keyboard. The wireless charging coil 650 may be arranged in a connection portion (for example, the connection portion C shown in FIG. 1) for movably connecting the keyboard body and a holder.

It may be understood that the schematic structure in this embodiment constitutes no specific limitation on the wireless keyboard. In some other embodiments, the wireless keyboard may include more or fewer components than those shown in the figure, or combine some components, or split some components, or have a different component configuration. The components shown in the figure may be implemented by hardware, software, or a combination of software and hardware.

The memory 620 may be configured to store program code, for example, program code for wirelessly charging an electronic stylus. The memory 620 may further store a Bluetooth address for uniquely identifying the wireless keyboard. In addition, the memory 620 may further store connection data of an electronic device that has been successfully paired with the wireless keyboard before. For example, the connection data may be a Bluetooth address of the electronic device that has been successfully paired with the wireless keyboard. Based on the connection data, the wireless keyboard can be automatically paired with the electronic device without the need to configure a connection therewith, for example, perform legality verification. The Bluetooth address may be a Media Access Control (Media Access Control, MAC) address.

The processor 610 may be configured to execute the program code, and call a related module to implement the functions of the wireless keyboard 100 in the embodiments of this application, for example, implement the wired charging function, the reverse wireless charging function, and the wireless communication function of the wireless keyboard. The processor 610 may include one or more processing units. Different processing units may be independent components, or may be integrated into one or more processors 610. The processor 610 may be specifically an integrated control chip, or may be formed by a circuit including various active and/or passive components, and the circuit is configured to perform the functions of the processor 610 described in the embodiments of this application. The processor of the wireless keyboard may be a microprocessor.

The wireless communication module 670 may be configured to support data exchange of wireless communication including Bluetooth (Bluetooth, BT), a global navigation satellite system (global navigation satellite system, GNSS), a wireless local area network (wireless local area network, WLAN) (for example, a wireless fidelity (wireless fidelity, Wi-Fi) network), frequency modulation (frequency modulation, FM), a near field communication (near field communication, NFC) technology, an infrared (infrared, IR) technology, and the like between the wireless keyboard and another electronic device.

In some embodiments, the wireless communication module 670 may be a Bluetooth chip. The wireless keyboard may be a Bluetooth keyboard. The wireless keyboard may be paired with and establish a wireless connection with a Bluetooth chip of another electronic device through the Bluetooth chip, to implement wireless communication between the wireless keyboard and the another electronic device through the wireless connection.

In addition, the wireless communication module 670 may further include an antenna. The wireless communication module 670 receives an electromagnetic wave through the antenna, performs frequency modulation and filtering processing on the electromagnetic wave signal, and sends the processed signal to the processor 610. The wireless communication module 670 may further receive a to-be-sent signal from the processor 610, perform frequency modulation and amplification on the to-be-sent signal, and convert the signal into an electromagnetic wave through an antenna and radiate the signal.

In some embodiments, the wireless keyboard may support wired charging. Specifically, the charging management module 640 may receive a charging input from the wired charger through the charging interface 630.

In some other embodiments, the wireless keyboard may support forward wireless charging. The charging management module 640 may receive a wireless charging input through the wireless charging coil 650 of the wireless keyboard. Specifically, the charging management module 640 is connected to the wireless charging coil 650 through a matching circuit. The wireless charging coil 650 may be coupled with a wireless charging coil of a wireless charger, and induce an alternating electromagnetic field emitted by the wireless charging coil of the wireless charger to generate an alternating current signal. The alternating current signal generated by the wireless charging coil 650 is transmitted to the charging management module 640 through the matching circuit, to wirelessly charge the battery 660.

The charging management module 640 may supply power to the wireless keyboard while charging the battery 660. The charging management module 640 receives an input of the battery 660, and supplies power to the processor 610, the memory 620, an external memory, the wireless communication module 670, and the like. The charging management module 640 may be further configured to monitor parameters such as a battery capacity, a battery cycle count, and a battery state of health (electric leakage and impedance) of the battery 660. In some other embodiments, the charging management module 640 may be alternatively arranged in the processor 610.

In some other embodiments, the wireless keyboard may support reserve wireless charging. Specifically, the charging management module 640 may further receive an input from the charging interface 630 or the battery 660, and convert a direct current signal inputted from the charging interface 630 or the battery 660 into an alternating current signal. The alternating current signal is transmitted to the wireless charging coil 650 through the matching circuit. The wireless charging coil 650 may generate an alternating electromagnetic field in response to receiving the alternating current signal. A wireless charging coil of another mobile terminal may perform wireless charging in response to inducing the alternating electromagnetic field. That is, the wireless keyboard may further wirelessly charge the another mobile terminal.

It should be noted that, the matching circuit may be integrated into the charging management module 640, and the matching circuit may alternatively be independent of the charging management module 640. This is not limited in the embodiments of this application. FIG. 6 is a schematic diagram of a hardware structure of a wireless keyboard by using an example in which the matching circuit may be integrated into the charging management module 640.

It should be noted that when the wireless keyboard shown in FIG. 6 is the wireless keyboard 100 shown in FIG. 5, the charging management module 640 shown in FIG. 6 integrates all functions of the wireless charging control module 130 and the charging control module 120 shown in FIG. 5.

For detailed descriptions of wired charging, forward wireless charging, and wireless charging performed by the wireless keyboard, refer to the description of the principles of wired charging, forward wireless charging, and reverse wireless charging of the wireless keyboard 100 in the foregoing examples. Details are not repeated in the embodiments of this application.

The charging interface 630 may be configured to provide a wired connection for charging or communication between the wireless keyboard and another electronic device (for example, a wired charger of the wireless keyboard). The wired charger of the wireless keyboard may be the power adapter 160 shown in FIG. 5, or may be an electronic device such as a tablet computer. The charging interface 630 of the wireless keyboard may be connected to an electronic device such as a tablet computer through a cable, and the electronic device such as the tablet computer may supply power to the wireless keyboard.

A touch sensor is integrated into the touchpad 680. A notebook computer may receive a control command of a user on the notebook computer through the touchpad 680 and the keyboard 690.

It may be understood that the schematic structure in this embodiment of this application constitutes no specific limitation on the wireless keyboard. The wireless keyboard may include more or fewer components than those shown in FIG. 6, or combine two or more components, or have a different component configuration. For example, an accommodating cavity for accommodating an electronic stylus may be further provided on a housing of the wireless keyboard. The wireless charging coil 650 is arranged in the accommodating cavity, and is configured to wirelessly charge the electronic stylus after the electronic stylus is accommodated in the accommodating cavity.

In another example, the outer surface of the wireless keyboard may further include components such as buttons, indicator lights (which may indicate states such as battery power, incoming/outgoing calls, and pairing modes), and a display screen (which may prompt the user with related information). The buttons may be physical buttons, touch buttons (which are used in cooperation with a touch sensor), or the like, and are configured to trigger operations such as power on, power off, start charging, and stop charging.

Wireless keyboards provided in the following embodiments may all include the foregoing hardware structure. The wireless keyboard provided in the embodiments of this application is described in detail in this embodiment of this application.

Figure 7:
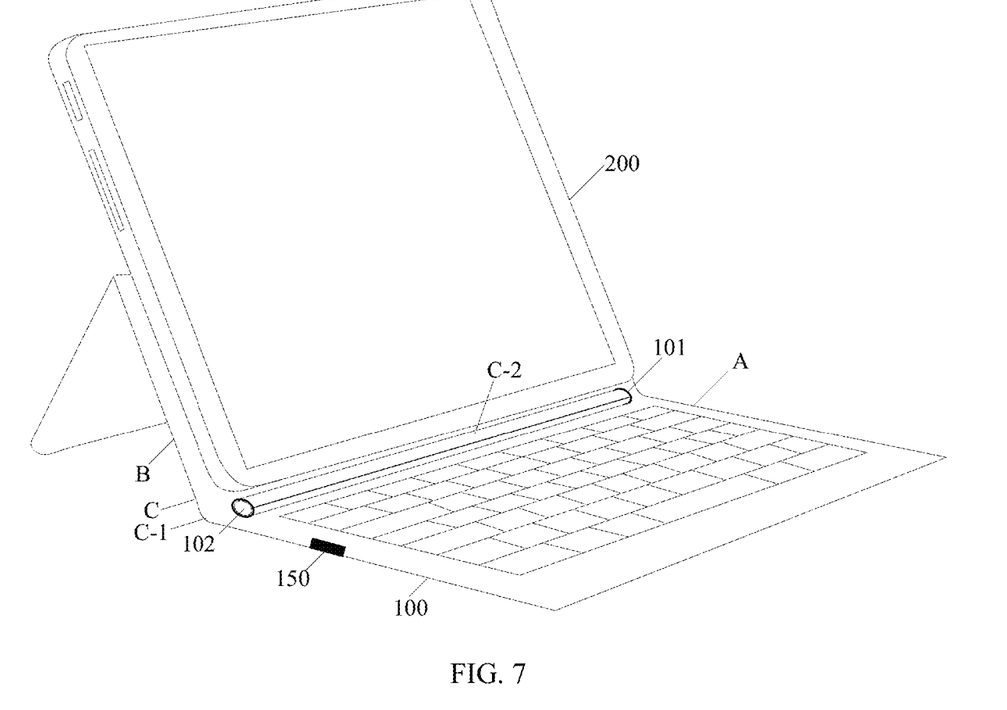
FIG. 7 is a schematic diagram of a product form of another wireless keyboard according to an embodiment of this application.
Figure 11:
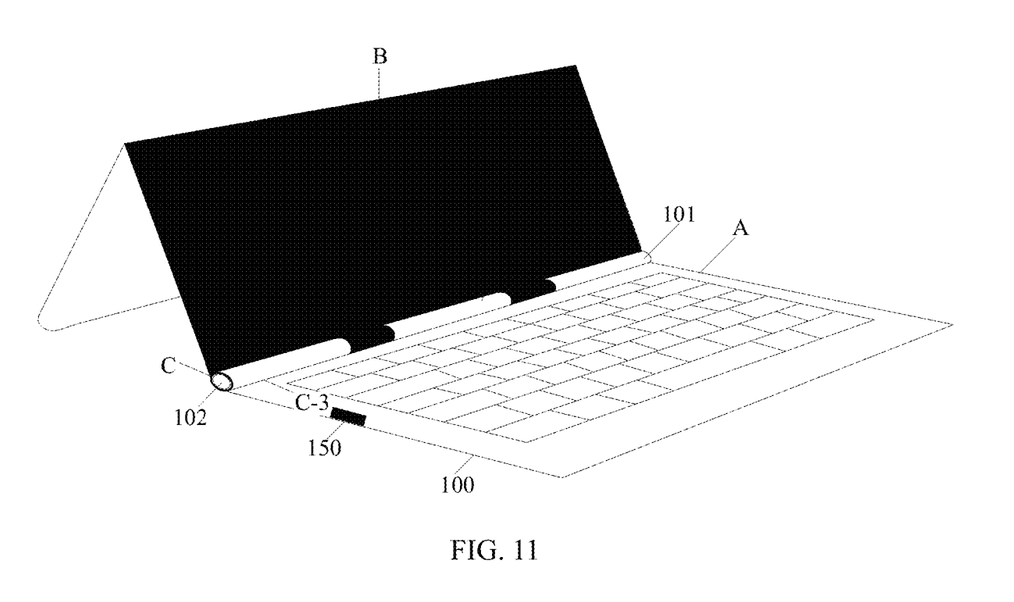
FIG. 11 is a schematic diagram of a product form of another wireless keyboard according to an embodiment of this application.

This embodiment of this application provides a wireless keyboard 100. As shown in FIG. 1, FIG. 7, or FIG. 11, the wireless keyboard 100 includes: a keyboard body A, a holder B for placing a tablet computer 200, and a connection portion C for movably connecting the keyboard body A and the holder B.

The connection portion C includes an accommodating cavity 101 with an opening 102 provided at an end. The accommodating cavity 101 is configured to accommodate the electronic stylus 300 shown in FIG. 2 through the opening 102.

In some embodiments, as shown in FIG. 1 or FIG. 7, the connection portion C may include a flexible connector C-1 and an accommodating component C-2. As shown in FIG. 1 or FIG. 7, the flexible connector C-1 is configured to bend to movably connect the keyboard body A and the holder B. For example, the flexible connector C-1 may be made of a flexible foldable material.

As shown in FIG. 1 or FIG. 7, the accommodating component C-2 is fixed in a bent region of the flexible connector C-1. The accommodating component C-2 is hollow inside, and the opening 102 is provided at an end of the accommodating component C-1 to form the accommodating cavity 101. A shape of an inner wall (that is, the accommodating cavity 101) of the accommodating component C-2 is similar to a shape of the body of the electronic stylus 300. For example, the inner wall of the accommodating component C-2 may be of any shape such as a cylinder or a polygonal prism. The accommodating component C-2 may be made of a plastic material.

Figure 8:
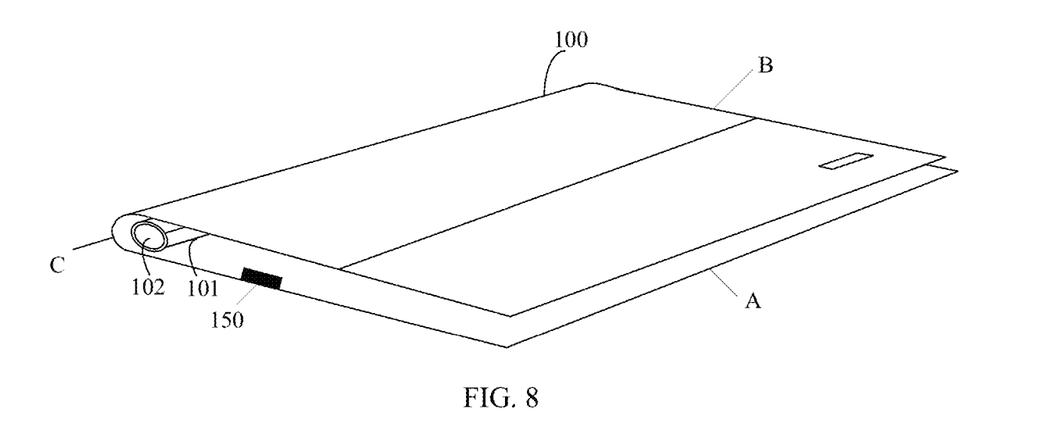
FIG. 8 is a schematic diagram of a product form of another wireless keyboard according to an embodiment of this application.
Figure 9:
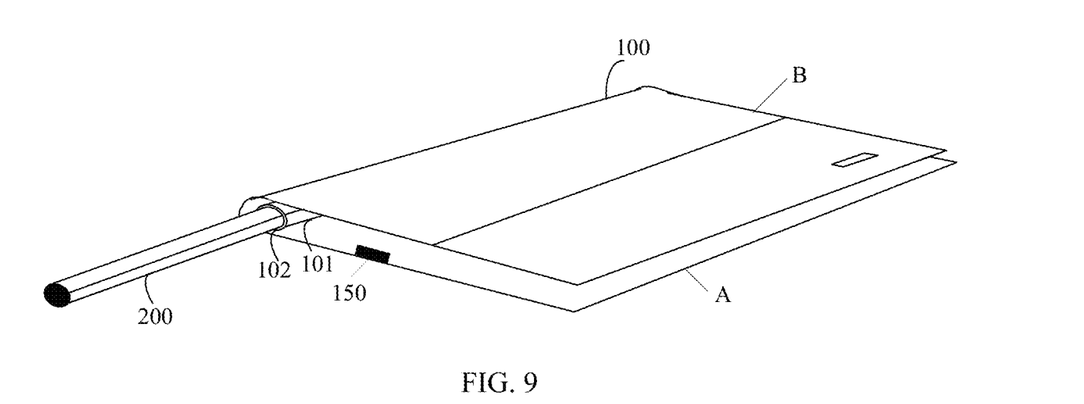
FIG. 9 is a schematic diagram of a product form of another wireless keyboard according to an embodiment of this application.

For example, FIG. 8 is a three-dimensional view of the wireless keyboard 100 before the keyboard body A and the holder B of the wireless keyboard 100 shown in FIG. 7 are combined, and the electronic stylus 300 is inserted into the accommodating cavity 101. FIG. 9 is a three-dimensional view of the wireless keyboard 100 when the keyboard body A and the holder B of the wireless keyboard 100 shown in FIG. 7 are combined, and the electronic stylus 300 has not been fully inserted into the accommodating cavity 101 through the opening 102. FIG. 9 is a three-dimensional view of the wireless keyboard 100 after the keyboard body A and the holder B of the wireless keyboard 100 shown in FIG. 7 are combined, and the electronic stylus 300 is inserted into the accommodating cavity 101 through the opening 102.

Figure 2:
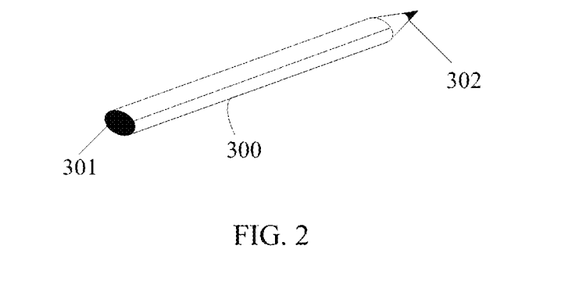
FIG. 2 is a schematic diagram of a product form of an electronic stylus according to an embodiment of this application.
Figure 10:
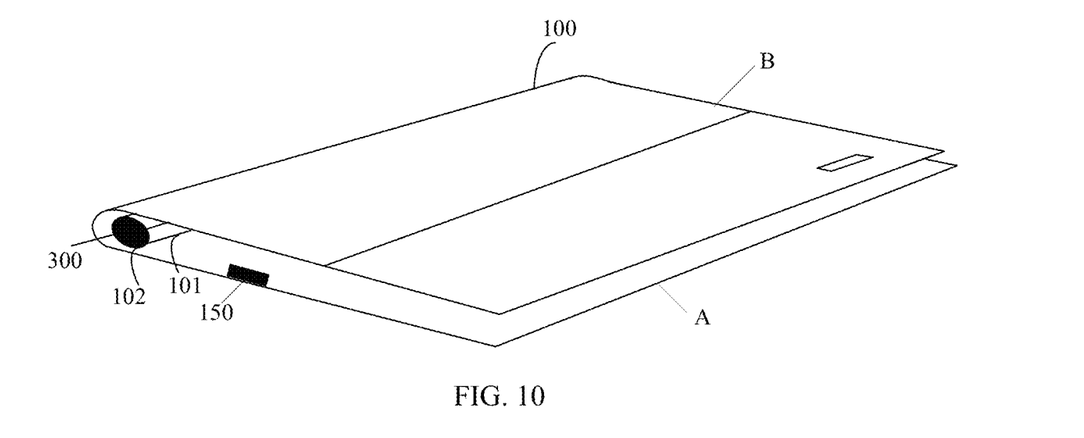
FIG. 10 is a schematic diagram of a product form of another wireless keyboard according to an embodiment of this application.

It should be noted that, different from FIG. 2 and FIG. 4, the tablet computer 200 is not fixed or mounted in the wireless keyboard 100 shown in FIG. 8, FIG. 9, and FIG. 10.

In some other embodiments, as shown in FIG. 11, the connection portion C includes a rotating shaft C-3 for movably connecting the keyboard body A and the holder B. As shown in FIG. 11, the rotating shaft C-3 is hollow inside, and the opening 102 is provided at an end of the rotating shaft C-3 to form the accommodating cavity 101.

The wireless charging coil 140 is arranged in the accommodating cavity 101 described in any one of the foregoing embodiments. As shown in FIG. 1, FIG. 7, or FIG. 11, a charging interface 150 is arranged in the keyboard body A. The keyboard body A further includes a wireless charging control module 130. As shown in FIG. 5, the wireless charging control module 130 is connected to the charging interface 150, and the wireless charging control module 130 is connected to the wireless charging coil 140. For example, the wireless keyboard 100 may include a wireless charging control chip (for example, a Tx chip). The wireless charging control module 130 may be integrated into the wireless charging control chip (for example, the Tx chip) to be implemented.

The charging interface 150 is configured to receive a direct current signal, for example, a direct current signal of 5 V. For example, the charging interface 150 may be any one of a Type-C interface, a Micro B interface, or a POGO pin interface. Certainly, the charging interface 150 in the embodiments of this application includes, but is not limited to, the Type-C interface, the Micro B interface, or the POGO pin interface. The charging interface 150 may alternatively be another interface that may provide a direct current signal. This is not limited in the embodiments of this application.

The wireless charging control module 130 is configured to convert, if it is detected that a direct current signal is inputted to the charging interface 150, the direct current signal into an alternating current signal and transmit the alternating current signal to the wireless charging coil 140.

The wireless charging coil 140 is configured to generate an alternating electromagnetic field in response to the alternating current signal, to wirelessly charge the electronic stylus 300 accommodated in the accommodating cavity 101.

Specifically, the wireless charging control module 130 of the wireless keyboard 100 may detect that a direct current signal is inputted to the charging interface 150. Generally, the charging interface 150 may include a power line, a data line (or referred to as a signal line), and a ground line. For example, the charging interface 150 being a USB interface is used as an example. The USB interface may include four lines: a power positive line (for example, a red line), a positive voltage data line (for example, a white line), a negative voltage data line (for example, a green line) and a ground line (for example, a black line).

The power line of the charging interface 150 is connected to the charging control module 120 and the wireless charging control module 130, and the data line of the charging interface 150 may also be connected to the charging control module 120 and the wireless charging control module 130. Therefore, when a direct current signal is inputted to the charging interface 150 (that is, there is a charging input), the wireless charging control module 130 may detect the direct current signal (that is, the charging input).

In some other embodiments, a direct current signal inputted to the charging interface 150 may be detected by a processor of the wireless keyboard 100. In this embodiment, the power line of the charging interface 150 is connected to the charging control module 120 and the wireless charging control module 130, and the data line of the charging interface 150 is connected to the processor. Therefore, when a direct current signal is inputted to the charging interface 150 (that is, there is a charging input), the processor may detect the direct current signal (that is, the charging input).

In this embodiment of this application, when the power adapter 160 of the wireless keyboard 100 is connected to a power supply and is connected to the charging interface 150, the power adapter may input a direct current signal to the charging interface 150. Specifically, after being connected to a power supply and connected to the charging interface 150, the power adapter 160 may convert a high-voltage alternating current (for example, an alternating current of 220 V) from the power supply into a low-voltage direct current (for example, a direct current of 5 V). The power adapter 160 inputs a direct current signal, for example, a direct current signal of 5 V, to the wireless keyboard 100 through the charging interface 150. After being inputted to the wireless keyboard 100 through the charging interface 150, the direct current signal may be used for wired charging or reverse wireless charging of the wireless keyboard 100.

Based on the above, the wireless keyboard 100 provided in the embodiments of this application not only has the function of accommodating the electronic stylus 300, but also can wirelessly charge the electronic stylus 300.

In the foregoing embodiments, the direct current signal inputted from the charging interface 150 provides an energy source for reverse wireless charging. In some other embodiments, the battery 110 of the wireless keyboard 100 may alternatively provide an energy source for reverse wireless charging.

In this embodiment, the wireless charging control module 130 may receive, when it is detected that the electronic stylus 300 is accommodated in the accommodating cavity 101 (that is, into box), a direct current signal from the battery 110 through the charging control module 120 and convert the direct current signal into an alternating current signal. In this way, the wireless charging coil 140 may generate an alternating electromagnetic field in response to the alternating current signal, to wirelessly charge the electronic stylus 300 accommodated in the accommodating cavity 101.

Certainly, the wireless charging control module 130 may alternatively stop receiving the direct current signal from the battery 110 when it is detected that the electronic stylus 300 is taken out from the accommodating cavity 101 (that is, out of box). Alternatively, out of box and into box of the electronic stylus 300 may be detected by the processor of the wireless keyboard 100, and a detection result may be notified to the wireless charging control module 130; or the processor instructs the wireless charging control module 130 to execute a corresponding event according to a detection result.

In this embodiment of this application, the method for detecting out of box and into box of the electronic stylus 300 may refer to a method for detecting out of box and into box in the conventional technologies, for example, a method for detecting out of box and into box of TWS earphones in the conventional technologies. Details are not repeated in the embodiments of this application.

In this embodiment, regardless of whether the charging interface 150 has a charging input, that is, regardless of whether a direct current signal is inputted to the charging interface 150, the wireless keyboard 100 may be provided with an energy source by the battery 110, to wirelessly charge the electronic stylus 300 accommodated in the accommodating cavity 101.

It may be understood that, if the energy source for preheating a battery cell is provided by the battery 110, Before the battery 110 is charged, the power of the battery 110 is consumed first. The more times the battery 110 is charged and discharged, the greater the loss to the battery 110, which affects the service life of the battery 110.

In addition, when a direct current signal is inputted to the charging interface 150 (that is, the charging interface 150 has a charging input), the direct current signal may charge the battery 110. In this way, in a process of charging the battery 110, the power of the battery 110 may decrease first and then increase, which may easily cause unnecessary misunderstandings to the user, making the user mistakenly believe that the battery 110 is faulty.

Based on the above, in the embodiments of this application, the direct current signal inputted from the charging interface 150 provides the energy source for preheating the battery cell, which can prevent the user from mistakenly believing that the battery 110 is faulty, and can further reduce unnecessary losses to the battery 110, prolonging the service life of the battery 110.

In some other embodiments, a voltage value of the direct current signal provided by the charging interface 150 may be different from a working voltage value of the wireless charging control module 130. For example, the working voltage value of the wireless charging control module 130 may be 5.5 V, and the voltage value of the direct current signal provided by the charging interface 150 may be 5 V. Alternatively, the voltage value of the direct current signal provided by the charging interface 150 may be unstable. In this way, the normal operation of the wireless charging control module 130 may be affected.

Figure 12:
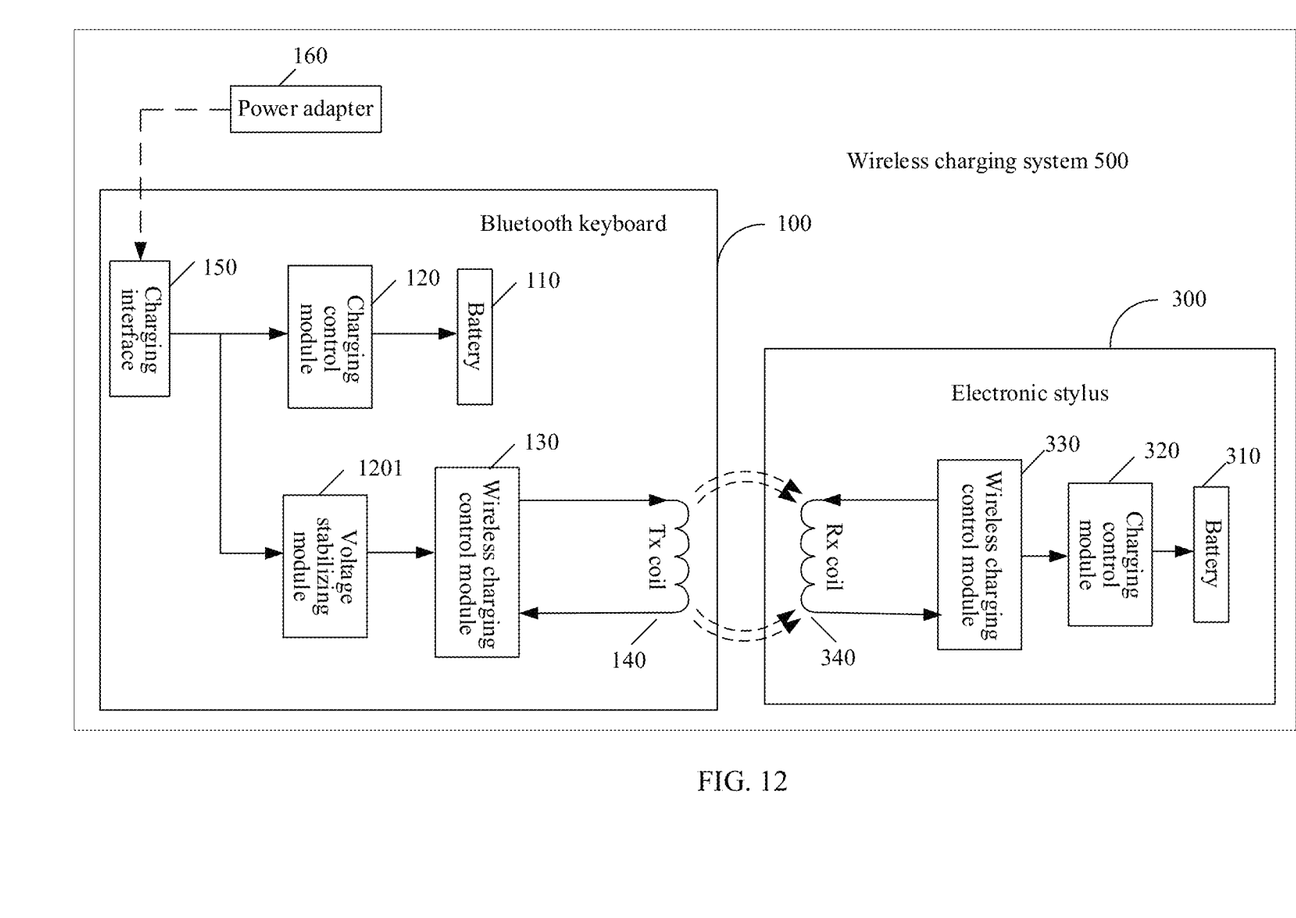
FIG. 12 is a schematic diagram of a system architecture of a wireless charging system according to an embodiment of this application.

Based on this situation, as shown in FIG. 12, the wireless keyboard 100 may further include a voltage stabilizing module 1201. That the wireless charging control module 130 is connected to the charging interface 150 may further include that: the wireless charging control module 130 is connected to the charging interface 150 through the voltage stabilizing module 1201.

The voltage stabilizing module 1201 is configured to convert a voltage of a direct current signal from the charging interface 150 into a working voltage of the wireless charging control module 130.

In this embodiment of this application, the voltage of the direct current signal provided by the charging interface 150 may be converted into the working voltage of the wireless charging control module 130 by using the voltage stabilizing module 1201. In this way, the normal operation of the wireless charging control module 130 can be guaranteed.

In some other embodiments, an elastic pressing component is further arranged in the accommodating cavity. When the electronic stylus 300 is accommodated in the accommodating cavity 101, the elastic pressing component is in contact with a first end 301 of the electronic stylus 300. As shown in FIG. 2, the first end 301 is an end located at the opening 120 when the electronic stylus 300 is accommodated in the accommodating cavity 101.

The elastic pressing component is configured to eject, in response to a press operation of a user on a second end 302 of the electronic stylus 300 accommodated in the accommodating cavity 101, the electronic stylus 300 out of the accommodating cavity 101 from the second end 302 toward the first end 301. The second end 302 is opposite to the first end 301. The elastic pressing component helps the user to take out the electronic stylus 300 from the accommodating cavity 101 of the wireless keyboard 100.

An embodiment of this application further provides a computer storage medium, including computer instructions, the computer instructions, when run on the foregoing wireless keyboard, causing the wireless keyboard to perform the functions or the steps performed by the wireless keyboard 100 in the foregoing embodiments.

An embodiment of this application further provides a computer program product, the computer program product, when run on a computer, causing the computer to perform the functions or the steps performed by the wireless keyboard in the foregoing embodiments.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an internal structure of an apparatus is divided into different functional modules to complete all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to an actual requirement to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A wireless keyboard, comprising:
a keyboard body, a holder for placing a tablet computer, and a connection portion for movably connecting the keyboard body and the holder, wherein the connection portion comprises an accommodating cavity with an opening at an end, the accommodating cavity is used for accommodating an electronic stylus through the opening, and a wireless charging coil is arranged in the accommodating cavity; a charging interface and a wireless charging control module are arranged in the keyboard body, the wireless charging control module is connected to the charging interface, and the wireless charging control module is connected to the wireless charging coil;

the charging interface is configured to receive a direct current signal;

the wireless charging control module is configured to convert, if it is detected that a direct current signal is inputted to the charging interface, the direct current signal into an alternating current signal and transmit the alternating current signal to the wireless charging coil; and the wireless charging coil is configured to generate an alternating electromagnetic field in response to the alternating current signal, to wirelessly charge a battery of the electronic stylus accommodated in the accommodating cavity, wherein the alternating electromagnetic field is configured to cause a wireless charging coil of the electronic stylus to generate an alternating current signal and transmit the alternating current signal to a wireless charging control module of the electronic stylus, the wireless charging control module of the electronic stylus is configured to convert the alternating current signal from the wireless charging coil of the electronic stylus to a direct current signal utilized by a charging control module of the electronic stylus to change the battery of the electronic stylus.

2. The wireless keyboard according to claim 1, wherein the connection portion comprises a rotating shaft, and the rotating shaft is configured to movably connect the keyboard body and the holder, wherein the rotating shaft is hollow inside, and an opening is provided at an end of the rotating shaft, to form the accommodating cavity.

3. The wireless keyboard according to claim 1, wherein the connection portion comprises a flexible connector and an accommodating component, wherein the flexible connector is configured to bend to movably connect the keyboard body and the holder; and the accommodating component is fixed in a bent region of the flexible connector, the accommodating component is hollow inside, and an opening is provided at an end of the accommodating component, to form the accommodating cavity.

4. The wireless keyboard according to claim 1, wherein a voltage stabilizing module is further arranged in the keyboard body, wherein that the wireless charging control module is connected to the charging interface comprises: the wireless charging control module is connected to the charging interface through the voltage stabilizing module; and the voltage stabilizing module is configured to convert a direct current signal from the charging interface into a working voltage of the wireless charging control module.

5. The wireless keyboard according to claim 1, wherein an elastic pressing component is further arranged in the accommodating cavity, wherein when the electronic stylus is accommodated in the accommodating cavity, the elastic pressing component is in contact with a first end of the electronic stylus; and the elastic pressing component is configured to eject, in response to a press operation of a user on a second end of the electronic stylus accommodated in the accommodating cavity, the electronic stylus out of the accommodating cavity from the second end toward the first end, wherein the first end is an end located at the opening when the electronic stylus is accommodated in the accommodating cavity, and the second end is opposite to the first end.

6. The wireless keyboard according to claim 1, wherein the charging interface comprises any one of a Type-C interface, a Micro B interface, or a POGO pin interface.

7. The wireless keyboard according to claim 1, wherein the keyboard body further comprises a charging control module and a battery, wherein the charging control module is connected to the battery, and the charging control module is connected to the charging interface; and the charging control module is configured to receive the direct current signal inputted from the charging interface, and use the direct current signal to charge the battery.

8. The wireless keyboard according to claim 1, wherein the wireless charging control module is integrated in a wireless charging control chip.

9. A wireless charging system, comprising: an electronic stylus, and a wireless keyboard, wherein the wireless keyboard comprises: a keyboard body, a holder for placing a tablet computer, and a connection portion for movably connecting the keyboard body and the holder, wherein the connection portion comprises an accommodating cavity with an opening at an end, the accommodating cavity is used for accommodating the electronic stylus through the opening, and a wireless charging coil is arranged in the accommodating cavity; a charging interface and a wireless charging control module are arranged in the keyboard body, the wireless charging control module is connected to the charging interface, and the wireless charging control module is connected to the wireless charging coil;

the charging interface is configured to receive a direct current signal;

the wireless charging control module is configured to convert, if it is detected that a direct current signal is inputted to the charging interface, the direct current signal into an alternating current signal and transmit the alternating current signal to the wireless charging coil; and the wireless charging coil is configured to generate an alternating electromagnetic field in response to the alternating current signal, to wirelessly charge the electronic stylus accommodated in the accommodating cavity;

wherein the electronic stylus comprises a wireless charging coil, a wireless charging control module, a charging control module, and a battery;

the wireless charging coil is configured to generate, after the electronic stylus is accommodated in the wireless keyboard, an alternating current signal by inducing an alternating electromagnetic field provided by the wireless keyboard, and transmit the alternating current signal to the wireless charging control module;

the wireless charging control module is configured to convert the alternating current signal into a direct current signal, and transmit the direct current signal to the charging control module; and the charging control module is configured to use the direct current signal to charge the battery.

10. The wireless charging system according to claim 9, wherein the connection portion comprises a rotating shaft, and the rotating shaft is configured to movably connect the keyboard body and the holder, wherein the rotating shaft is hollow inside, and an opening is provided at an end of the rotating shaft, to form the accommodating cavity.

11. The wireless charging system according to claim 9, wherein the connection portion comprises a flexible connector and an accommodating component, wherein the flexible connector is configured to bend to movably connect the keyboard body and the holder; and the accommodating component is fixed in a bent region of the flexible connector, the accommodating component is hollow inside, and an opening is provided at an end of the accommodating component, to form the accommodating cavity.

12. The wireless charging system according to claim 9, wherein a voltage stabilizing module is further arranged in the keyboard body, wherein that the wireless charging control module is connected to the charging interface comprises: the wireless charging control module is connected to the charging interface through the voltage stabilizing module; and the voltage stabilizing module is configured to convert a direct current signal from the charging interface into a working voltage of the wireless charging control module.

13. The wireless charging system according to claim 9, wherein an elastic pressing component is further arranged in the accommodating cavity, wherein when the electronic stylus is accommodated in the accommodating cavity, the elastic pressing component is in contact with a first end of the electronic stylus; and the elastic pressing component is configured to eject, in response to a press operation of a user on a second end of the electronic stylus accommodated in the accommodating cavity, the electronic stylus out of the accommodating cavity from the second end toward the first end, wherein the first end is an end located at the opening when the electronic stylus is accommodated in the accommodating cavity, and the second end is opposite to the first end.

14. The wireless charging system according to claim 9, wherein the charging interface comprises any one of a Type-C interface, a Micro B interface, or a POGO pin interface.

15. The wireless charging system according to claim 9, wherein the keyboard body further comprises a charging control module and a battery, wherein the charging control module is connected to the battery, and the charging control module is connected to the charging interface; and the charging control module is configured to receive the direct current signal inputted from the charging interface, and use the direct current signal to charge the battery.

16. The wireless charging system according to claim 9, wherein the wireless charging control module is integrated in a wireless charging control chip.

17. A method comprising:

receiving a tablet computer in a holder of a wireless keyboard, the wireless keyboard including the holder, a keyboard body, and a connection portion for movably connecting the keyboard body and the holder;

receiving an electronic stylus within an accommodating cavity of the connection portion of the wireless keyboard, wherein a wireless charging coil is arranged in the accommodating cavity, a charging interface and a wireless charging control module are arranged in the keyboard body, the wireless charging control module is connected to the charging interface, and the wireless charging control module is connected to the wireless charging coil;

detecting, at the wireless charging control module of the wireless keyboard, that a first direct current signal is inputted to the charging interface of the wireless keyboard;

converting, by the wireless charging control module of the wireless keyboard, the first direct current signal into a first alternating current signal in response to detection that the first direct current signal is inputted to the charging interface; and transmitting the first alternating current signal to the wireless charging coil of the wireless keyboard;

generating, by the wireless charging coil of the wireless keyboard, an alternating electromagnetic field in response to the first alternating current signal;

generating, by a wireless charging coil of the electronic stylus and with the electronic stylus accommodated in the wireless keyboard, a second alternating current signal by inducing the alternating electromagnetic field provided by the wireless keyboard;

transmitting, by the wireless charging coil of the electronic stylus, the second alternating current signal to a wireless charging control module of the electronic stylus;

converting, by the wireless charging control module of the electronic stylus, the second alternating current signal into a second direct current signal; and utilizing, by a charging control module of the electronic stylus, the second direct current signal to charge a battery of the electronic stylus.

18. The method according to claim 17, wherein the charging interface comprises any one of a Type-C interface, a Micro B interface, or a POGO pin interface.

19. The method according to claim 17, wherein the keyboard body further comprises a charging control module and a battery, the charging control module is connected to the battery, the charging control module is connected to the charging interface, and the method further comprises:

receiving the first direct current signal inputted from the charging interface; and charging the battery of the wireless keyboard using the first direct current signal.

20. The method according to claim 17, wherein the wireless charging control module is integrated in a wireless charging control chip.

* * * * *

UNITED STATES PATENT AND TRADEMARK OFFICE
CERTIFICATE OF CORRECTION

PATENT NO. : 12,130,970 B2
APPLICATION NO. : 17/924223
DATED : October 29, 2024
INVENTOR(S) : Yuan Wu et al.

Page 1 of 1

It is certified that error appears in the above-identified patent and that said Letters Patent is hereby corrected as shown below:

In the Claims

Column 15, Claim 1, Line 33, delete "change the battery" and insert --charge the battery--.

Signed and Sealed this
Sixth Day of May, 2025

Coke Morgan Stewart
*Acting Director of the United States Patent and Trademark Office*